US012440859B2

(12) United States Patent
Lamboux et al.

(10) Patent No.: US 12,440,859 B2
(45) Date of Patent: Oct. 14, 2025

(54) SYSTEM AND METHOD FOR REFILLING A BOTTLE WITH VISCOUS LIQUID

(71) Applicant: TECHNIPLAST, Louviers (FR)

(72) Inventors: Jean-Philippe Lamboux, Louviers (FR); Loïc Bouet, Louviers (FR)

( * ) Notice: Subject to any disclaimer, the term of this patent is extended or adjusted under 35 U.S.C. 154(b) by 8 days.

(21) Appl. No.: 18/636,347

(22) Filed: Apr. 16, 2024

(65) Prior Publication Data

US 2024/0342737 A1 Oct. 17, 2024

(30) Foreign Application Priority Data

Apr. 17, 2023 (FR) ....................................... 2303833

(51) Int. Cl.
*B05B 11/00* (2023.01)
*B65D 47/26* (2006.01)
*B67D 7/02* (2010.01)

(52) U.S. Cl.
CPC ...... *B05B 11/0097* (2013.01); *B05B 11/0008* (2013.01); *B65D 47/265* (2013.01); *B67D 7/0288* (2013.01)

(58) Field of Classification Search
CPC ..... B65F 47/32; B65F 47/2012; B65F 47/265
See application file for complete search history.

(56) References Cited

U.S. PATENT DOCUMENTS 2,142,644 A * 1/1939 Gould .................. B65D 47/265 222/546
4,176,694 A * 12/1979 Dickerson ................ B67D 7/46 141/304
6,364,473 B1 * 4/2002 Liu ...................... B41J 2/17506 347/85
6,457,899 B1 10/2002 Lin
8,925,593 B2 1/2015 Lamboux
2016/0167843 A1 * 6/2016 Toh ........................ B65D 47/32 222/481

FOREIGN PATENT DOCUMENTS

DE 1129851 B 5/1962
FR 3007007 A1 12/2014
WO 2014085875 A1 6/2014

OTHER PUBLICATIONS

English translation of DE1129851.
English abstract of FR3007007 A1.
English abstract of WO2014085875 A1.

* cited by examiner

*Primary Examiner* — Timothy P. Kelly

(57) ABSTRACT

System for recharging with viscous liquid a bottle to be recharged from a source bottle inverted above the aperture of the bottle, comprising:

- a liquid passage opening out through one end inside the bottle,
- a distinct air passage, which extends from the bottle to the bottle and putting into communication the interior of the bottle and the bottom of the bottle for the rise of air towards the latter, while liquid is transferred from the bottle to the bottle via the liquid passage,
- a device for restricting the air passage disposed inside the bottle above the end so as to stop, or at least slow down, the rise of liquid in the bottle, and therefore the flow of liquid, when the liquid level in the bottle reaches the restriction device.

19 Claims, 15 Drawing Sheets

[Fig. 1]
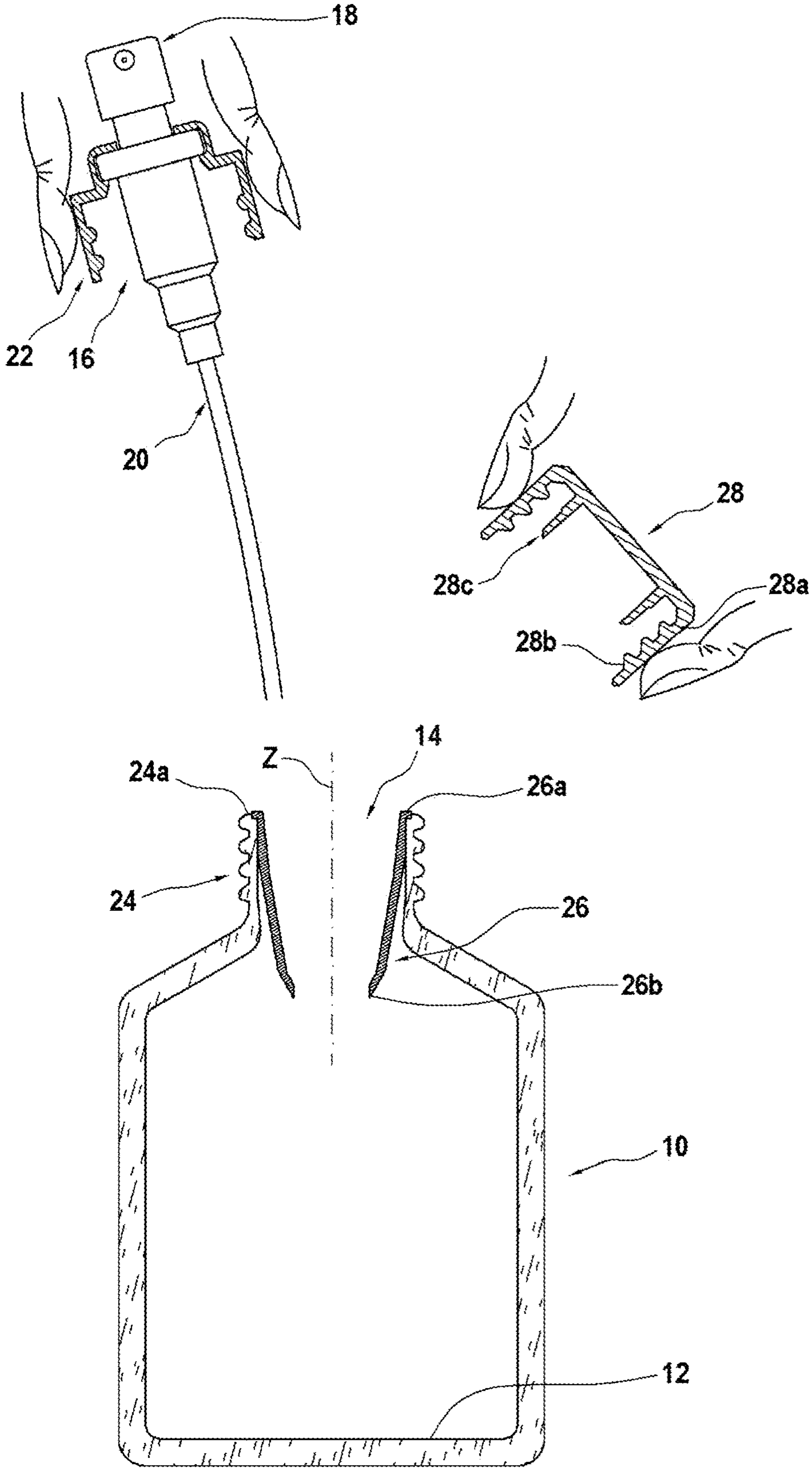

[Fig. 2]
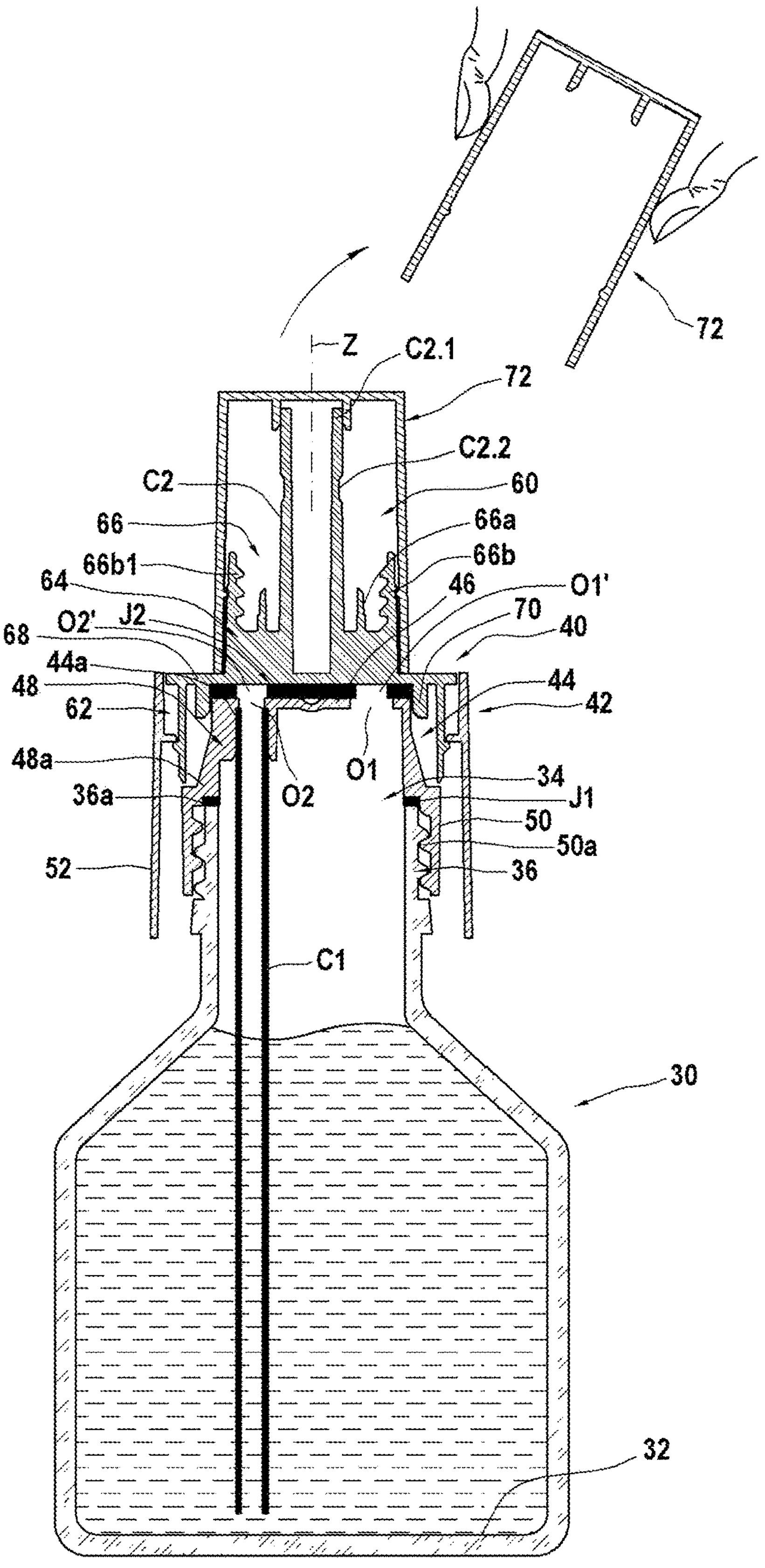

[Fig. 3]
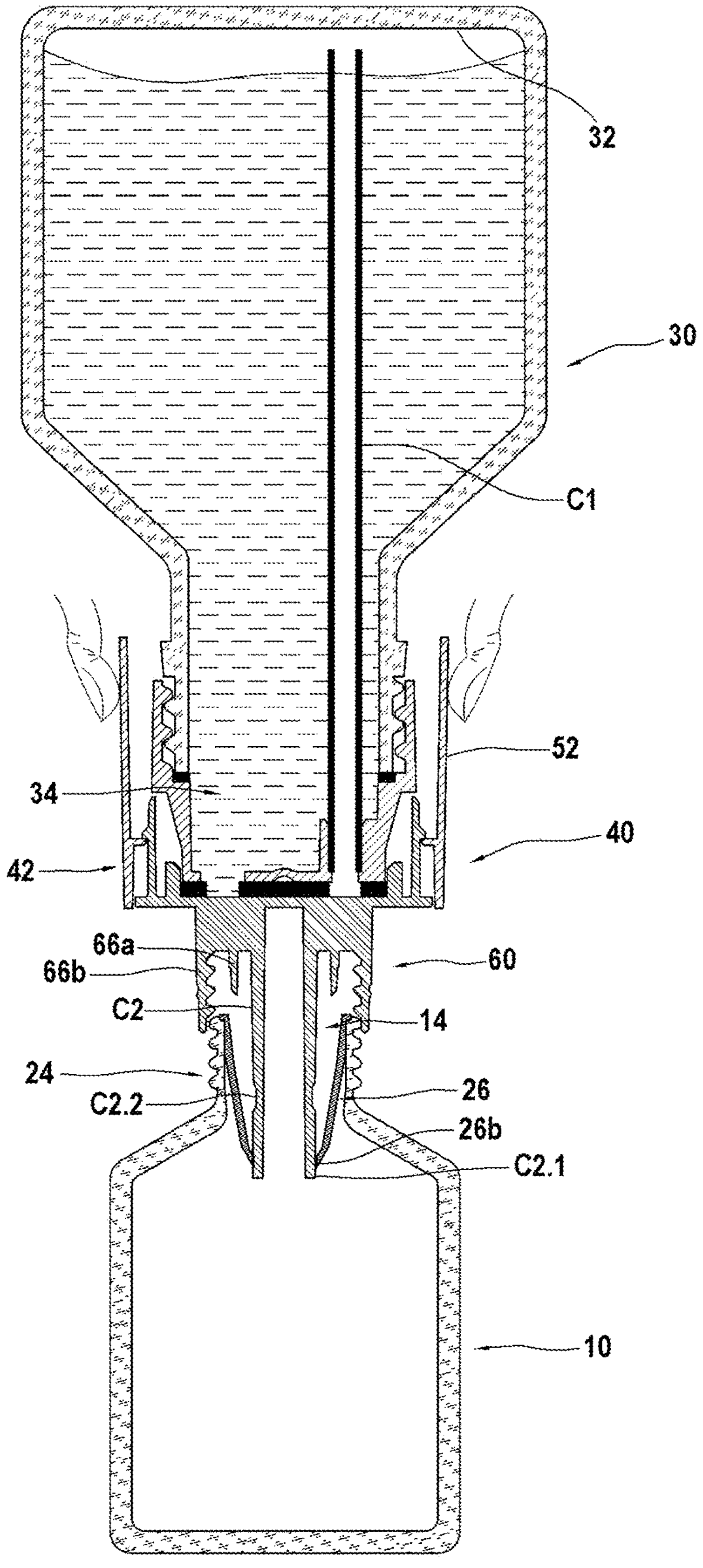

[Fig. 4]
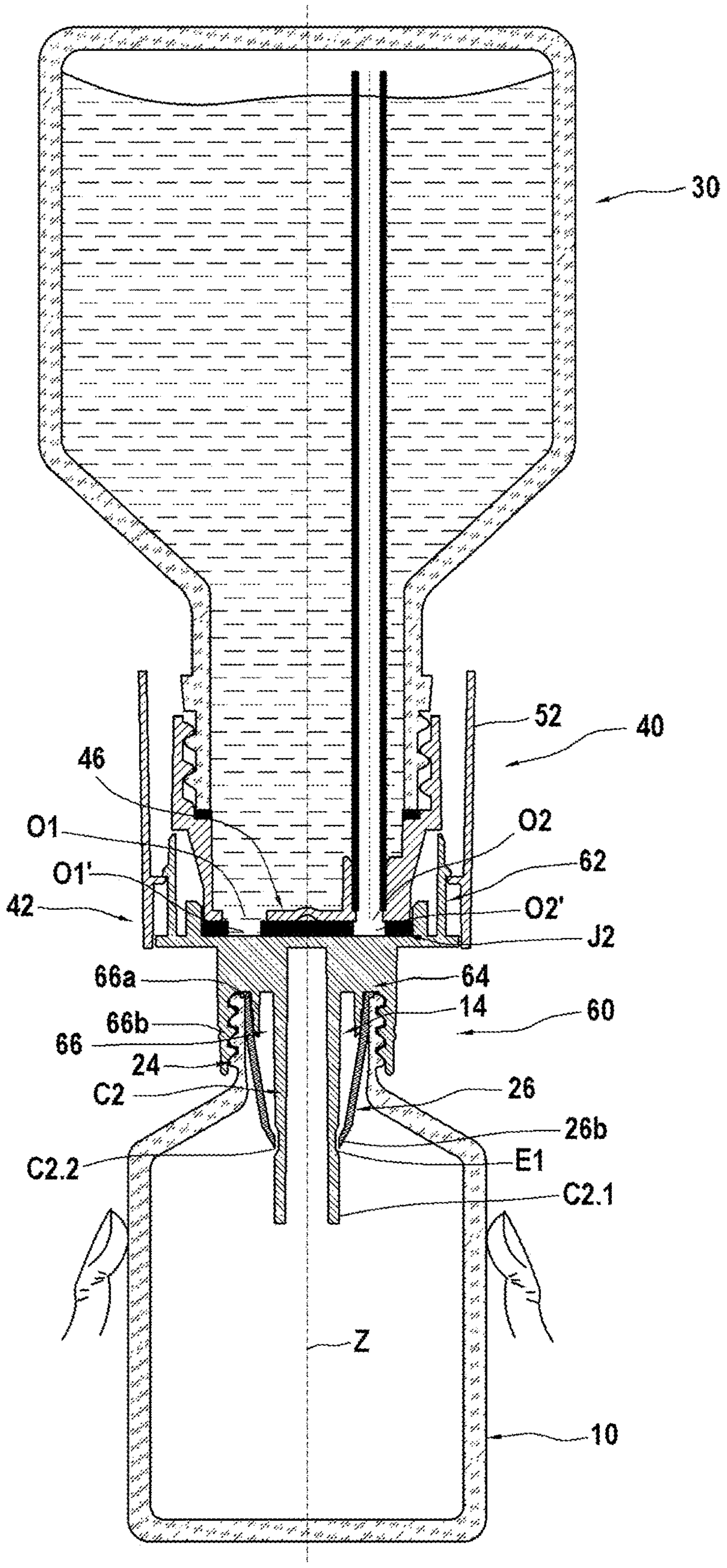

[Fig. 5]
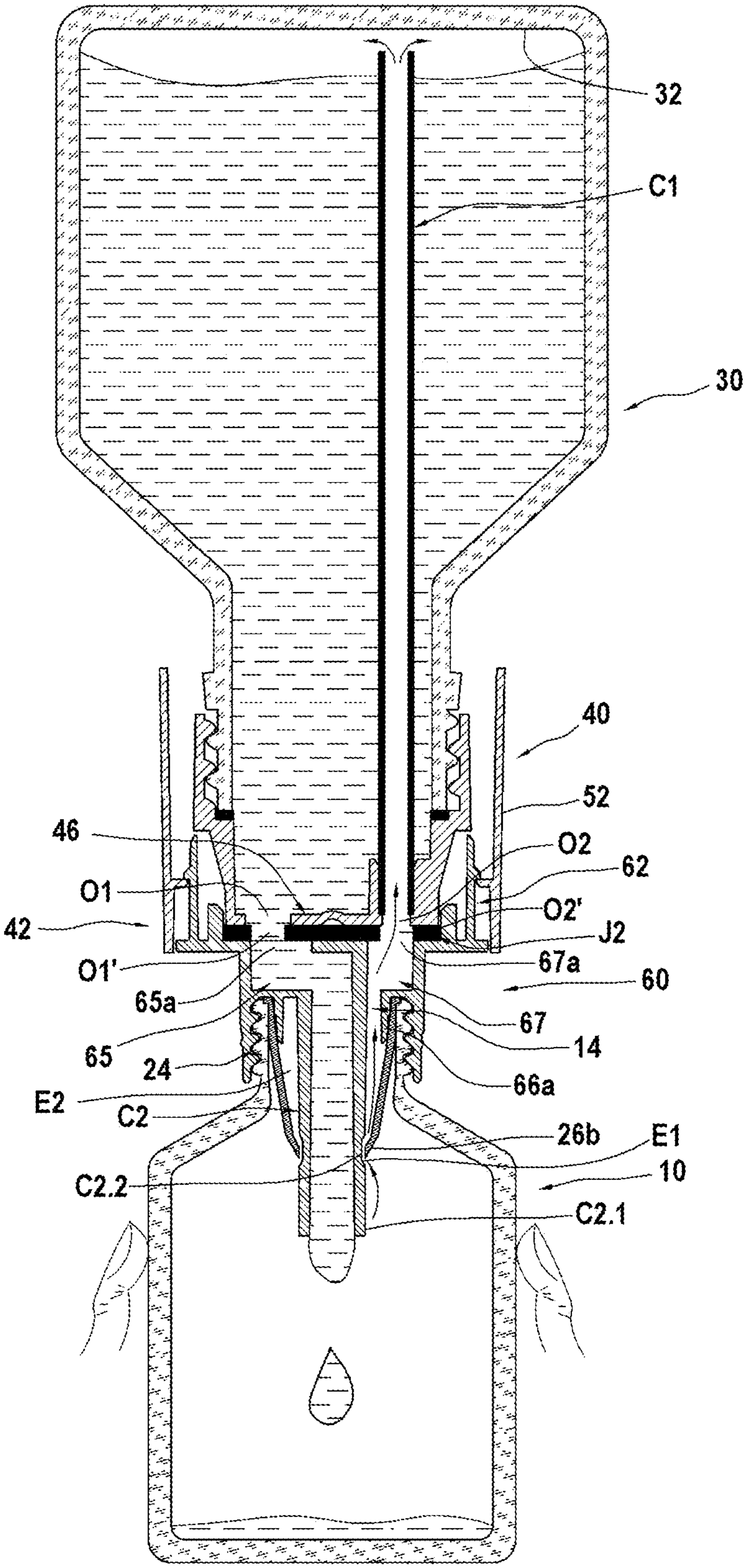

[Fig. 6]
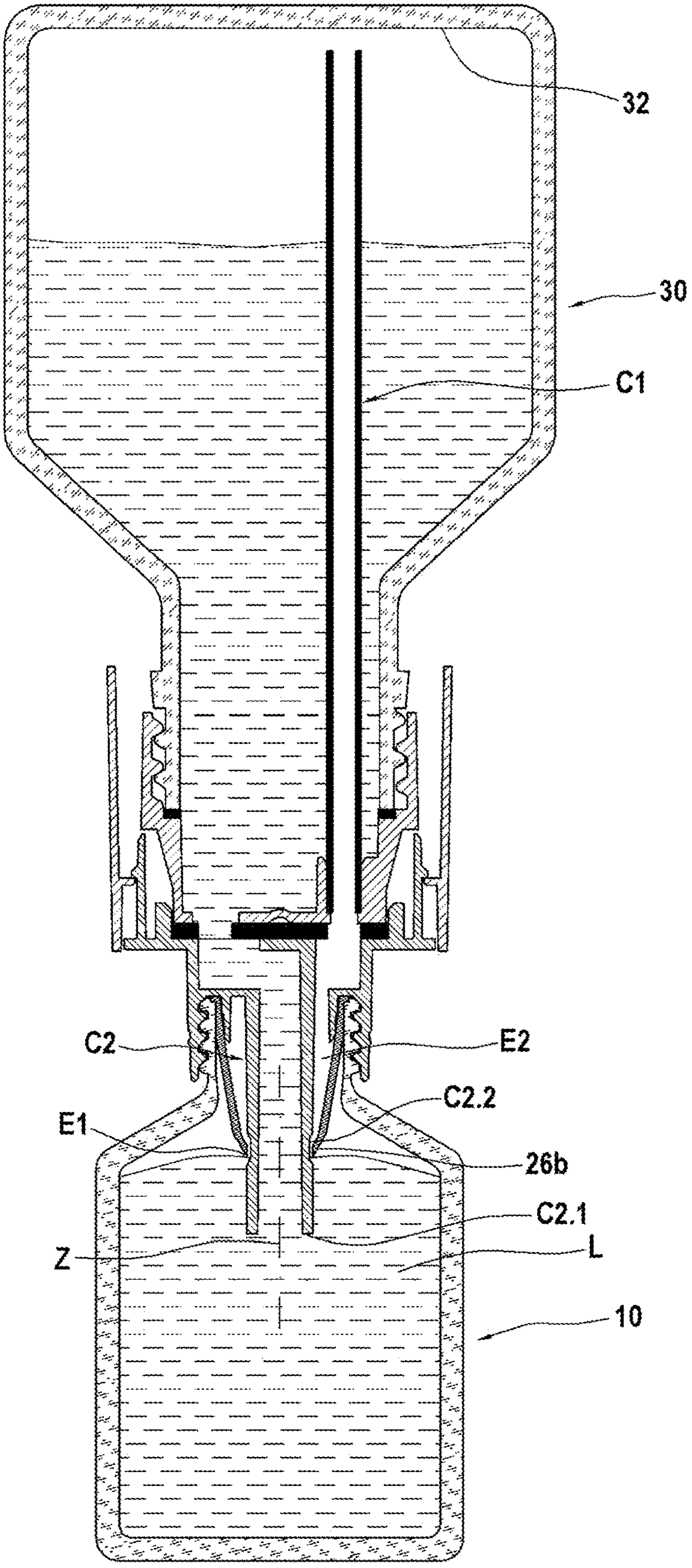

[Fig. 7]
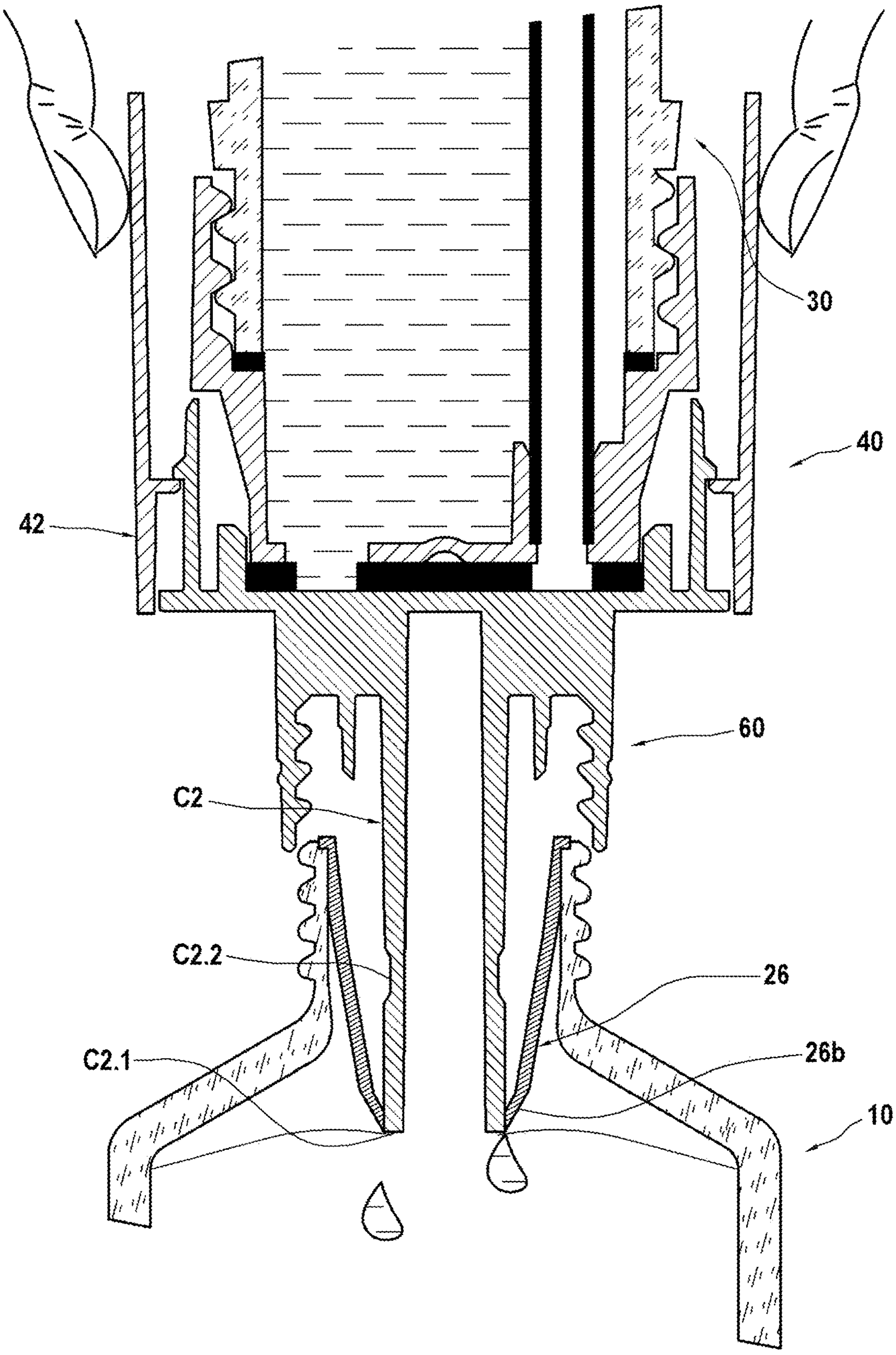

[Fig. 8A]
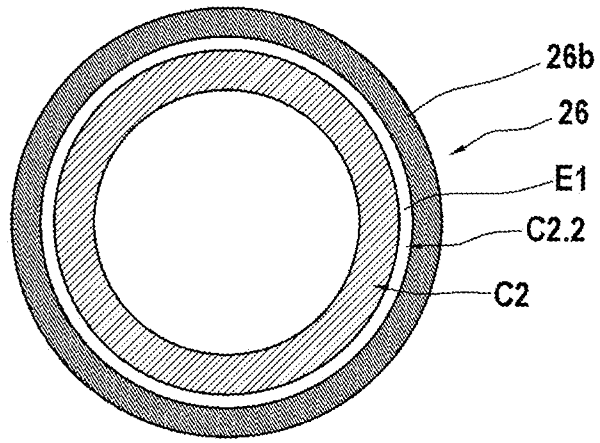
[Fig. 8B]
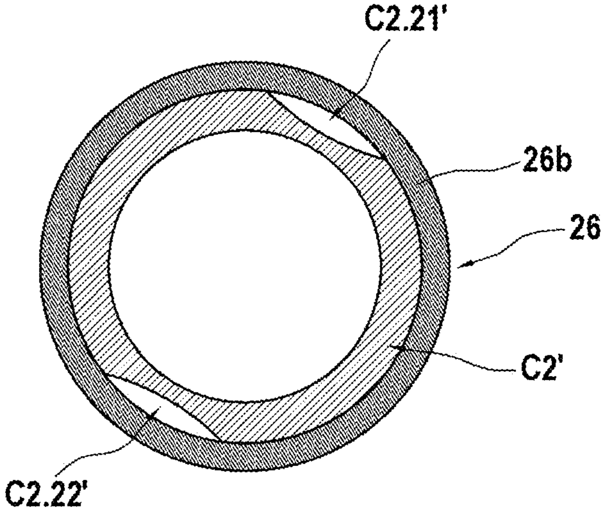

[Fig. 8C]
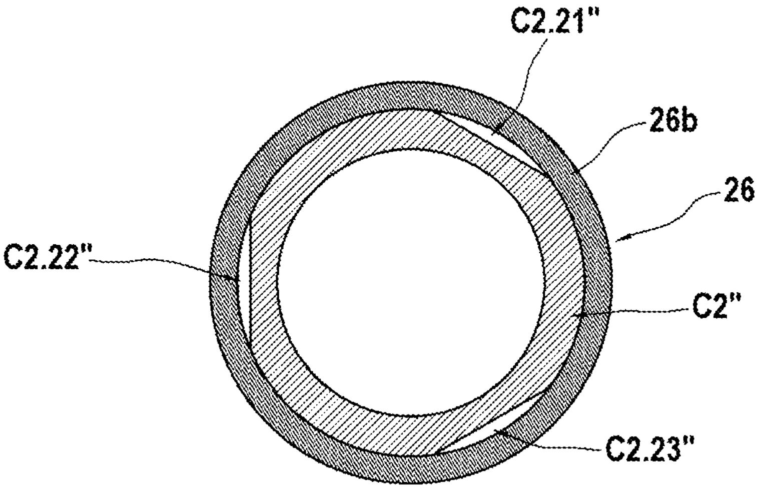
[Fig. 8D]
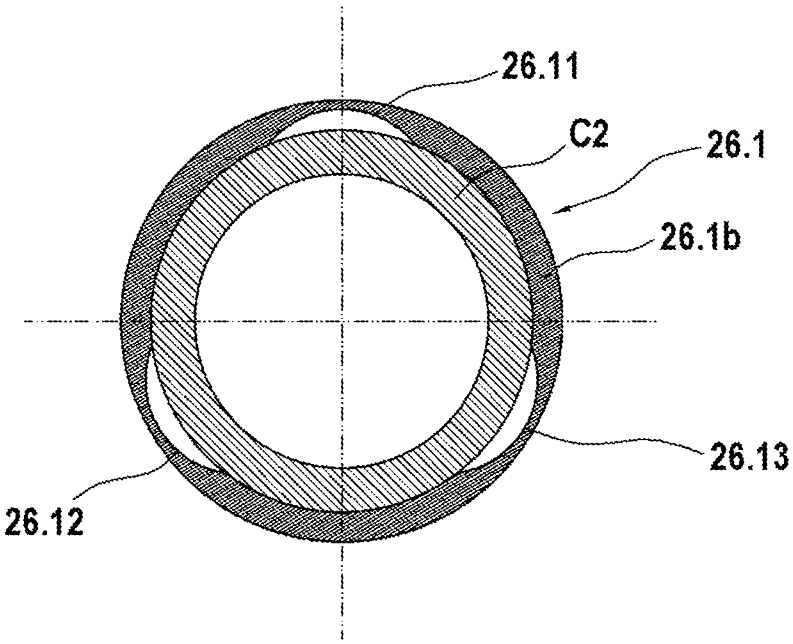

[Fig. 9]
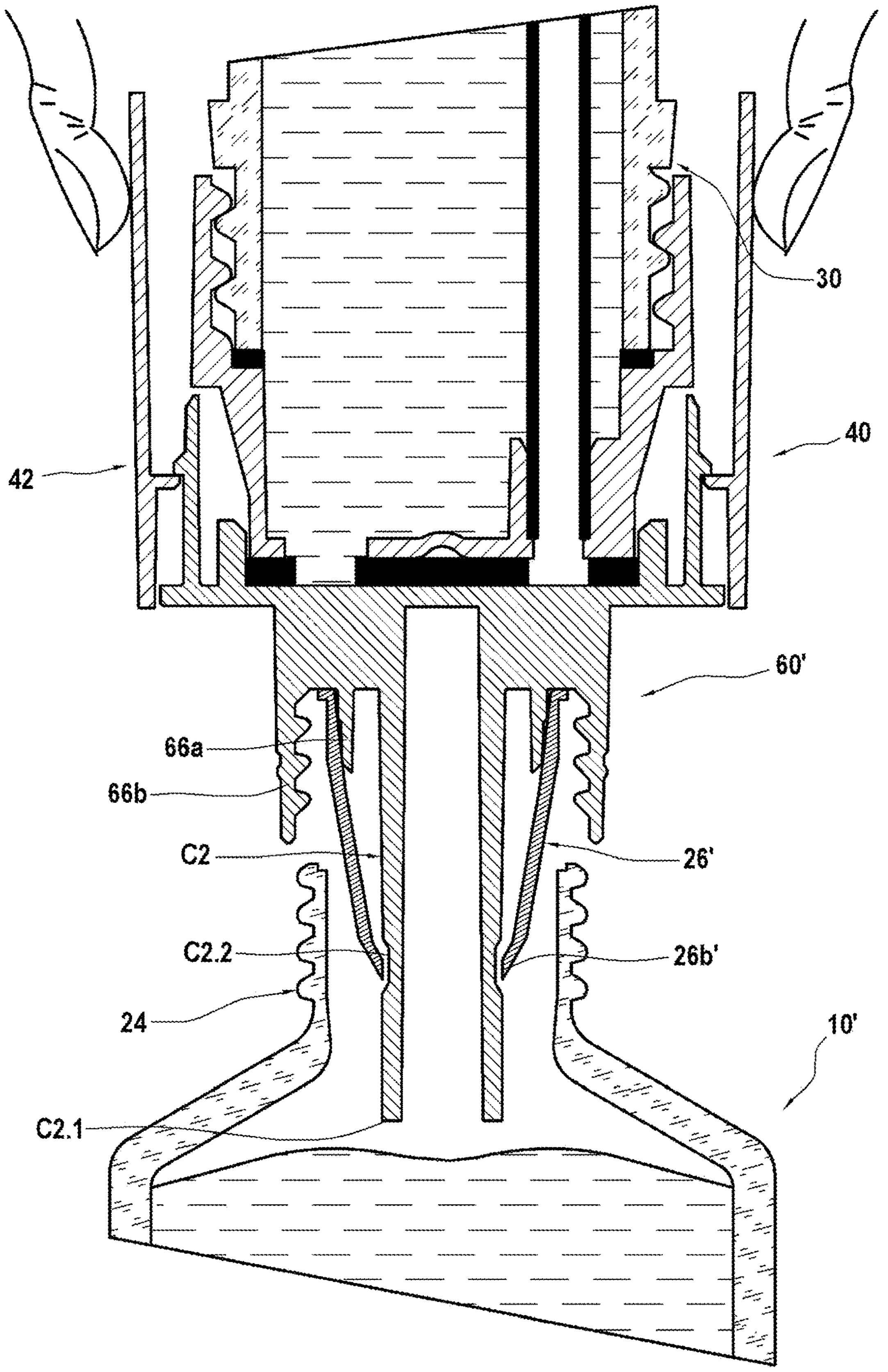

[Fig. 10]
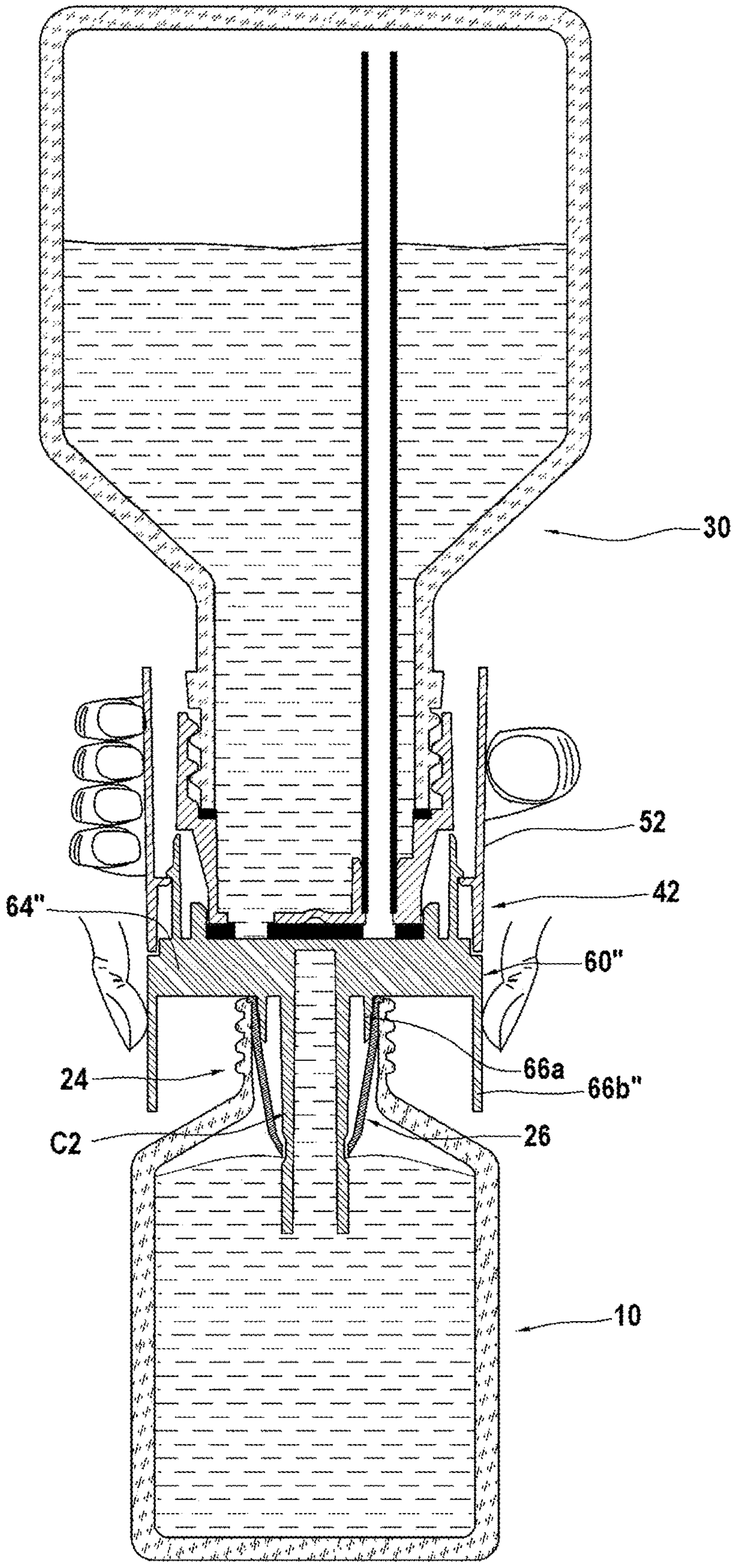

[Fig. 11A]
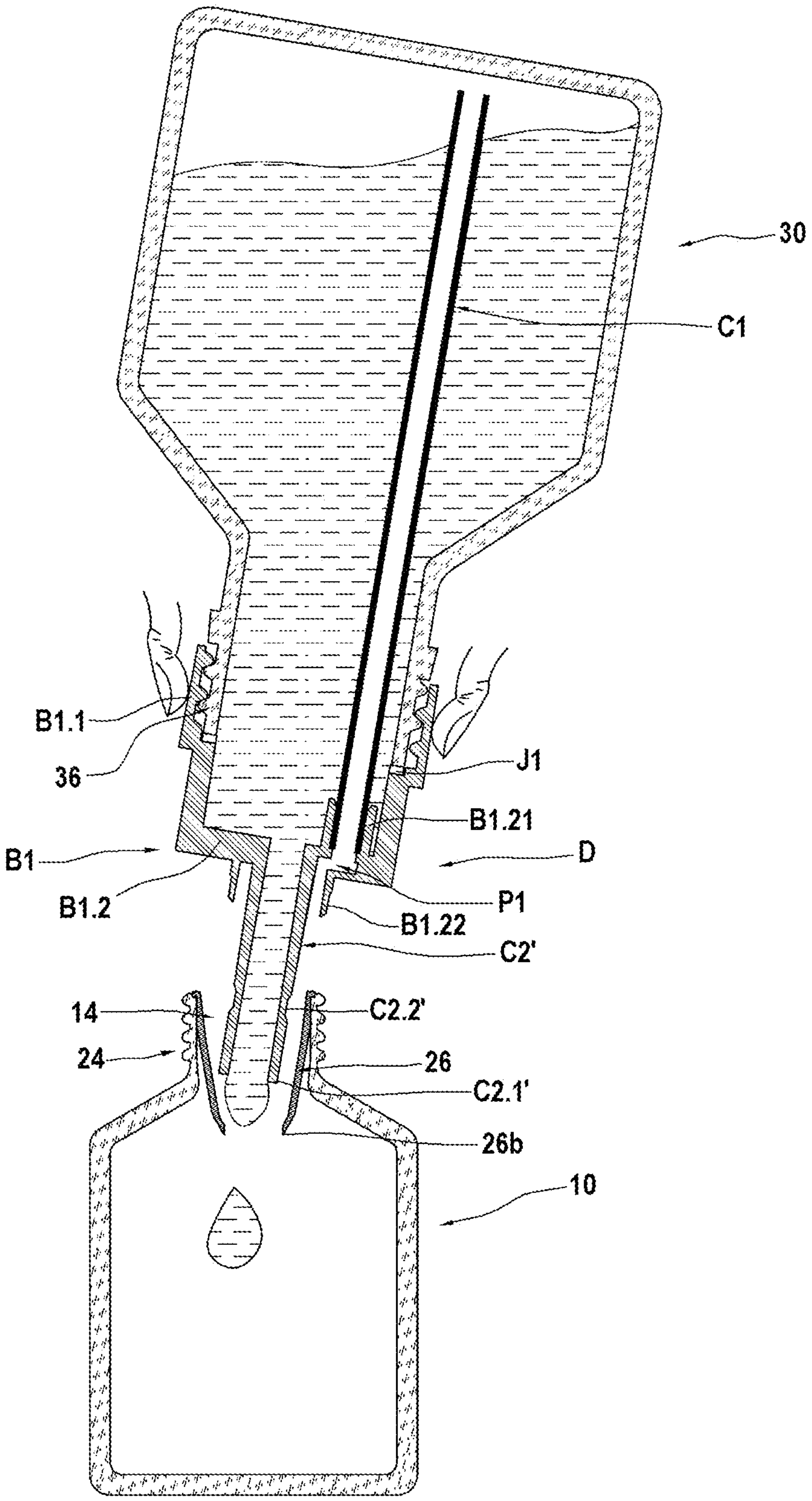

[Fig. 11B]
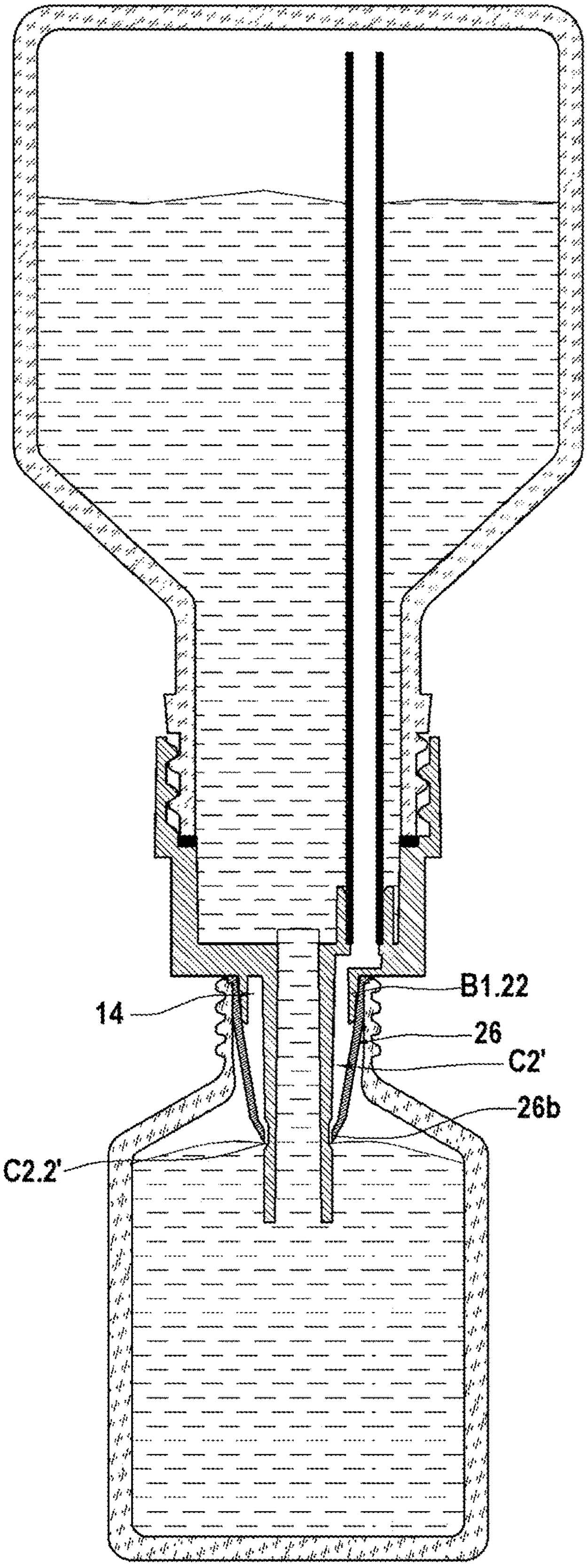

[Fig. 12A]
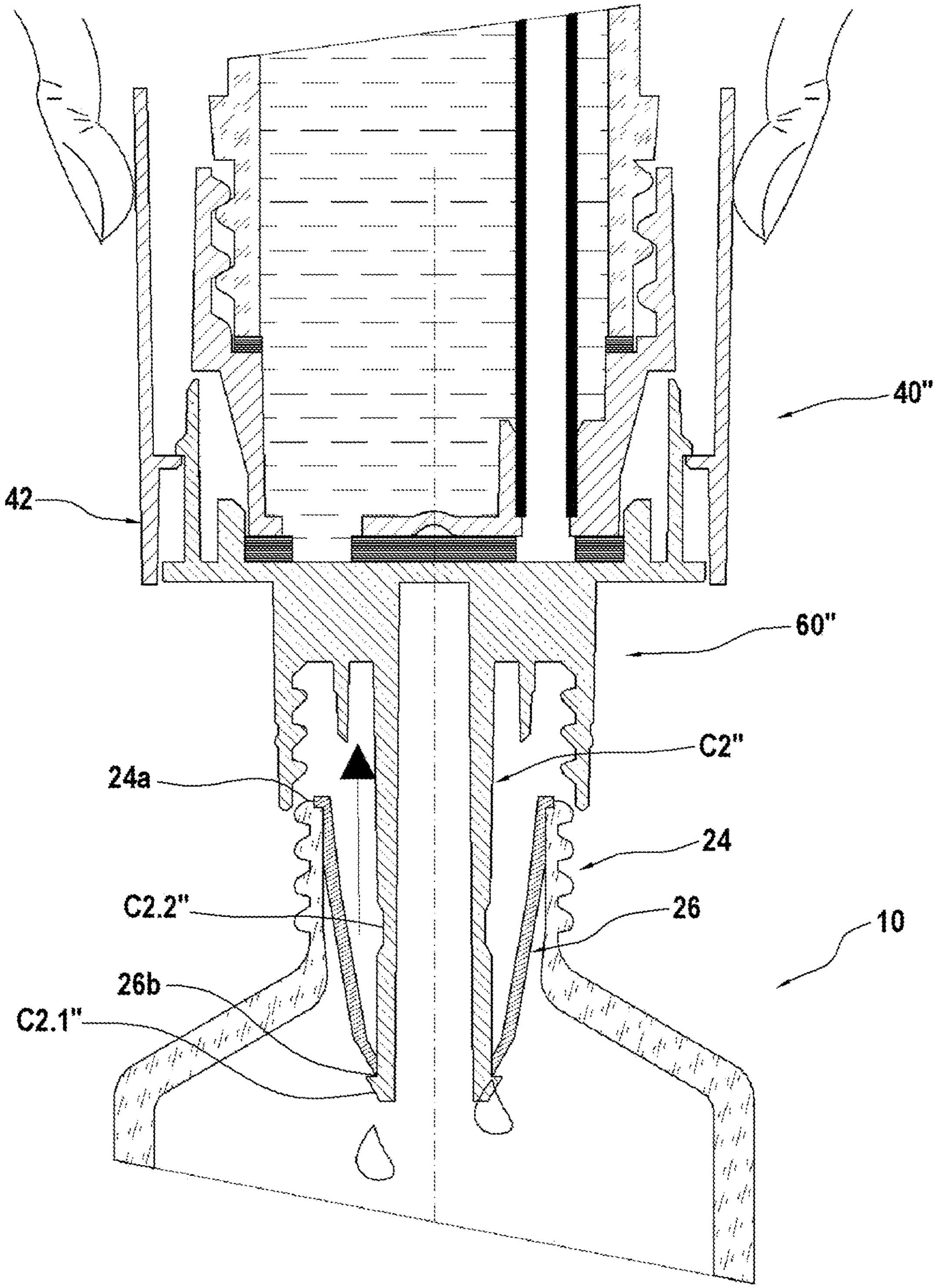

[Fig. 12B]
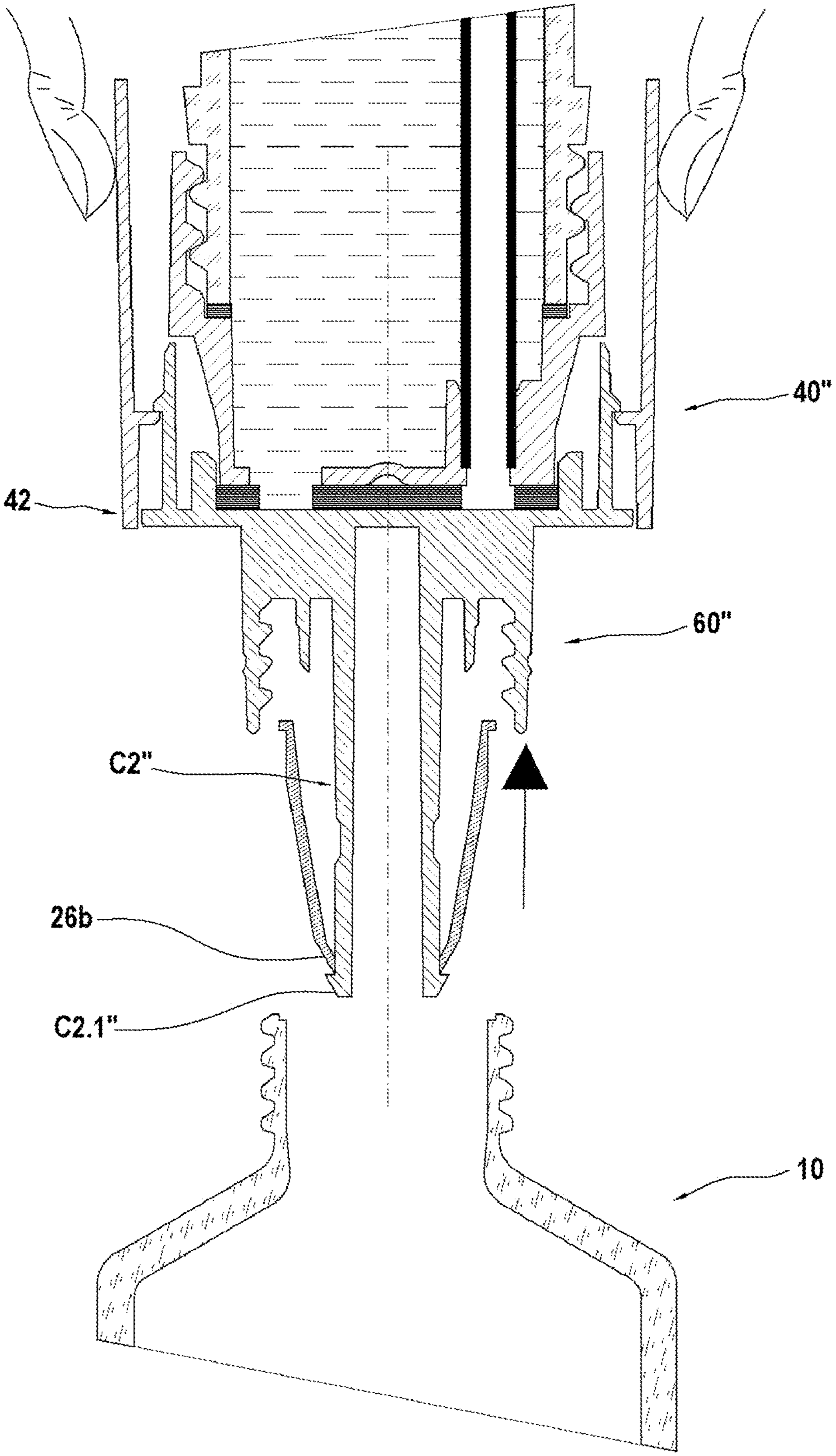

SYSTEM AND METHOD FOR REFILLING A BOTTLE WITH VISCOUS LIQUID

TECHNICAL FIELD

The present invention relates to the field of recharging with liquid or re-filling a bottlebottle to be recharged from a source bottlebottle called recharge. The present invention more particularly relates to a system for recharging with liquid a bottlebottle to be recharged from a recharge and also to a method for recharging with liquid a bottlebottle to be recharged from a recharge.

PRIOR ART

Different systems and methods exist for transferring liquid from one bottle to another with a view to recharging the latter.

However, when the liquid to be transferred is viscous, typically an oil, a shower gel, etc., the transfer is more difficult to carry out and sometimes requires the use of relatively complex systems.

There is therefore a need to have a system and a method for simply and efficiently transferring a viscous liquid from a source bottle to a bottle to be recharged.

DISCLOSURE OF THE INVENTION

The object of the invention is thus a system for recharging with liquid a bottle to be recharged from a source bottle containing a viscous liquid, the bottle to be recharged having an aperture disposed above the bottom and the source bottle having an aperture and a bottom opposite to the aperture, the source bottle containing viscous liquid being inverted such that its aperture is disposed above the aperture of the bottle to be recharged, the system comprising:

a liquid passage which extends between the source bottle and the bottle to be recharged by opening out through an opening end inside the bottle to be recharged and which is able to put into communication the source bottle and the interior of the bottle to be recharged so as to allow the transfer of liquid from the source bottle to the bottle to be recharged through the liquid passage, the liquid passage comprising a liquid conduit provided with the opening end of the liquid passage and which extends axially at least partly inside the bottle to be recharged, an air passage distinct from the liquid passage and which extends from the interior to the exterior of the bottle to be recharged through the aperture of the bottle to be recharged so as to allow the discharge of air from the bottle to be recharged while liquid is transferred from the source bottle to the bottle to be recharged, a part surrounding the liquid conduit coaxially and providing with the liquid conduit one or several radial spaces defining a reduced passage section of the air passage which is adapted to the viscosity of the liquid, the reduced passage section of the air passage being disposed inside the bottle to be recharged above the opening end of the liquid conduit so as to stop, or at least slow down, the rise of liquid in the bottle to be recharged, and therefore the flow of liquid in said bottle to be recharged, when the liquid level in the bottle to be recharged reaches the reduced passage section of the air passage.

The aforementioned system makes it possible to simply and efficiently transfer a viscous liquid from the source bottle to the bottle to be recharged located below. The gesture-based implementation of such a system is particularly simple for the user. Moreover, the design of the system is such that the flow of liquid from the source bottle to the bottle to be recharged is stopped or at least slowed down automatically without the user having to intervene. To do so, the passage section of the air passage is locally reduced (by construction) in the part of the system which is located above the opening end of the liquid passage, inside the bottle to be recharged so that, when the flow of liquid inside the bottle to be recharged causes the rise of the liquid level in the latter until reaching the reduced passage section, the liquid cannot, or in any case can very hardly, continue to rise in the bottle to be recharged by crossing this reduced passage section, due to its viscosity and to the dimensions of the reduced passage section which are adapted to this viscosity. The local reduction or restriction of the air passage section is considered in relation to the generally larger section of the air passage in the remaining part of the air passage of the system. This configuration of the system (passage restriction area) makes it possible to control the re-filling level in the bottle to be recharged. In some embodiments, depending on the viscosity of the liquid and of the passage sections available, the flow of liquid from the source bottle to the bottle to be recharged can be done by simple gravity or by creating a pressure inside the source bottle, for example by manually deforming, by compression, the deformable outer walls of the source bottle. It will be noted that this system more particularly applies to liquids whose viscosity is at least 20 to 25 Centipoises. Moreover, the passage section internal to the liquid passage also depends on the viscosity of the liquid and will be greater as the liquid is viscous. It will be noted that the re-filling of the bottle to be recharged can take several seconds, or even several tens of seconds, without however exceeding several minutes and in particular without exceeding 5 minutes. For example, the inner passage section of the liquid passage for an oil may be less than that for a shower gel. Depending on the system configurations, the liquid and air passages can each be made in at least two portions which are either disjoined in a blocking or closing position, or joined in a position allowing the passage of fluid in these passages (the liquid flowing and the air rising). According to one alternative configuration, the liquid and air passages can already be formed integrally and for example mounted on one of the two bottles (e.g. the source bottle above) and the only positioning of the source bottle in the inverted position with the passage of liquid introduced into the aperture of the bottle to be recharged allows the liquid to be transferred. Moreover, depending on the configurations, the system can be designed such that, in the installed position, the assembly formed by the source bottle and the bottle to be recharged is mechanically secured thanks to inner fixing means between some elements of the system.

According to other possible characteristics:

the part surrounding an external surface of the liquid conduit includes a terminal end which is configured to engage radially in a radially recessed annular portion of the external surface of the liquid conduit; generally, the terminal end does not come into contact with the bottom of the radially recessed annular portion in order to leave an open passage section between the two elements;

the part surrounding the liquid conduit is mounted on the bottle to be recharged;

the air passage extends from the bottle to be recharged to the source bottle and is able to put into communication the interior of the bottle to be recharged and the bottom of the source bottle so as to allow the rise of air from the bottle to be recharged towards the bottom of the source bottle, while liquid is transferred from the source bottle to the bottle to be recharged; it will be noted that in a variant, the air passage which extends from the bottle to be recharged to the source bottle is able to put into communication the interior of the bottle to be recharged and the interior of the source bottle so as to allow the rise of air from the bottle to be recharged towards the source bottle, while liquid is transferred from the source bottle to the bottle to be recharged;

the system includes a liquid transfer device mounted on the source bottle and which comprises the liquid conduit;

the part surrounding the liquid conduit is mounted on the liquid transfer device;

the liquid transfer device also comprises an air conduit which forms part of the air passage and which extends inside the source bottle toward the bottom of the latter;

the liquid transfer device comprises two rings rotatably mounted relative to each other, namely a ring comprising, on the one hand, the liquid conduit which forms a first portion of the liquid passage and, on the other hand, a first portion of the air passage and another ring comprising, on the one hand, a second portion of the liquid passage and, on the other hand, a second portion of the air passage;

the two rings are able to occupy, on the one hand, a blocking position in which the two portions of the liquid passage and the two portions of the air passage of the two respective rings are not in fluid communication with each other and, on the other hand, a transfer position in which the two portions of the liquid passage and the two portions of the air passage of the two respective rings are in fluid communication with each other so as to allow the transfer of liquid from the source bottle to the bottle to be recharged through the two portions of the liquid passage which are in fluid communication with each other, and to transfer the air contained in the bottle to be recharged to the source bottle through the reduced passage section of the air passage and the two portions of the air passage in fluid communication with each other;

the system includes a seal forming a fluid communication interface between the two rings.

The object of the invention is also a method for recharging with liquid a bottle to be recharged from a source bottle containing a viscous liquid in a system comprising, on the one hand, a bottle to be recharged having an aperture disposed above the bottom and, on the other hand, a source bottle containing viscous liquid and having an aperture and a bottom opposite to the aperture, the source bottle being inverted such that its aperture is disposed above the aperture of the bottle to be recharged, the method comprising the following steps:

flowing of liquid from the source bottle to the bottle to be recharged via a liquid passage which opens out through an opening end inside the bottle to be recharged in which the liquid rises, discharge of the air contained in the bottle to be recharged through an air passage distinct from the liquid passage and which extends from the interior to the exterior of the bottle to be recharged through the aperture of the bottle to be recharged, while the liquid level rises in the bottle to be recharged, stopping or slowdown of the rise of liquid in the bottle to be recharged, and therefore the flowing of liquid in the bottle to be recharged via the liquid passage, when the liquid level in the bottle to be recharged reaches a reduced passage section of the air passage which is disposed inside the bottle to be recharged above the opening end of the liquid passage, the stopping or slowdown of the rise of liquid in the bottle to be recharged being due to the adaptation between the reduced passage section of the air passage and the viscosity of the liquid.

The method above includes the same advantages as those mentioned above in relation to the system and will therefore not be repeated.

According to other possible characteristics:

the liquid passage comprises a liquid conduit which is provided with the opening end of the liquid passage and which extends axially at least partly inside the bottle to be recharged;

prior to the steps of flowing of liquid, discharge of air and stopping or slowdown of the rise of liquid, the method comprises a prior step during which the opening end of the liquid conduit which is fixed to the source bottle is introduced inside the bottle to be recharged;

the system comprises two rings rotatably mounted relative to each other, namely a ring comprising, on the one hand, the liquid conduit which forms a first portion of the liquid passage and, on the other hand, a first portion of the air passage and another ring comprising, on the one hand, a second portion of the liquid passage and, on the other hand, a second portion of the air passage;

one ring is fixed to the source bottle and the other ring is fixed to the bottle to be recharged with the opening end of the liquid conduit which is introduced inside the bottle to be recharged; when a single ring is fixed to the source bottle by a first part, the second part including the liquid conduit can be positioned on the bottle to be recharged with the opening end of the liquid conduit which is introduced inside the bottle to be recharged;

when the ring is screwed onto the bottle to be recharged, the method includes a step during which a relative rotational movement between the two bottles, and therefore between the two rings, is carried out in order to put into fluid communication the two portions of the liquid passage and the two portions of the air passage of the two respective rings with each other and thusto allow the flow of liquid from the source bottle to the bottle to be recharged through the two portions of the liquid passage in fluid communication and the rise of the air contained in the bottle to be recharged through the reduced passage section of the air passage and the two portions of the air passage in fluid communication;

the air contained in the bottle to be recharged is transferred from the bottle to be recharged to the source bottle via the air passage;

the system includes a part surrounding the liquid conduit coaxially and providing with the liquid conduit one or several radial spaces defining the reduced passage section of the air passage;

during the removal of the liquid conduit from the bottle to be recharged, the part surrounding the liquid conduit scrapes the external surface of the liquid conduit to its opening end. A relative movement is thus carried out between, on the one hand, the part surrounding the liquid conduit, in particular an opening end of this part and, on the other hand, the external surface of the liquid conduit. It will be noted that during this phase of removal of the liquid conduit from the bottle to be recharged, the part can remain mounted on the bottle to be recharged. However, when the opening end of the part surrounding the liquid conduit reaches the opening end of the liquid conduit, either the liquid conduit continues its extraction, alone, out of the bottle and the opening end of the part surrounding the liquid conduit slides on the opening end of the liquid conduit, or the liquid conduit is shaped, in particular by its free opening end, to carry with it, during its removal, the part, for example by hooking in the process its opening end.

BRIEF DESCRIPTION OF THE DRAWINGS

Other characteristics and advantages will appear during the following description, given only by way of non-limiting example and made with reference to the appended drawings, in which:

FIG. 1 is a schematic axial sectional view of a part of a liquid re-filling system comprising a bottle to be recharged according to one embodiment of the invention;

FIG. 2 is a schematic axial sectional view of a part of a liquid re-filling system comprising a source bottle provided with a liquid transfer device according to one embodiment of the invention;

FIG. 3 is a schematic axial sectional view of a complete liquid re-filling system comprising the bottle to be recharged in FIG. 1 and the source bottle in FIG. 2 in the inverted position, during the mounting on the bottle to be recharged;

FIG. 4 is a schematic axial sectional view of the complete system of FIG. 3 mounted on the bottle to be recharged;

FIG. 5 is a schematic axial sectional view of the system of FIG. 4 after rotation of one of the rings of the liquid transfer device and beginning of the filling of the bottle to be recharged;

FIG. 6 is a schematic view of the system of FIG. 5 showing the stopping or the slowdown of the filling of the bottle to be recharged;

FIG. 7 is a schematic axial sectional view of the system of FIG. 6 during the removal of the ring of the liquid transfer device which was engaged inside the bottle to be recharged;

FIG. 8A is a schematic cross-sectional view of one possible embodiment of a device for restricting a passage section of the air passage;

FIG. 8B is a schematic cross-sectional view of another possible embodiment of a device for restricting a passage section of the air passage;

FIG. 8C is a schematic cross-sectional view of another possible embodiment of a device for restricting a passage section of the air passage;

FIG. 8D is a schematic cross-sectional view of another possible embodiment of a device for restricting a passage section of the air passage;

FIG. 9 is a schematic axial sectional view of a liquid re-filling system according to a first variant of embodiment;

FIG. 10 is a schematic axial sectional view of a liquid re-filling system according to a second variant of embodiment;

FIG. 11A is a schematic axial sectional view of a liquid re-filling system according to a third variant of embodiment during the positioning on a bottle to be recharged;

FIG. 11B is a schematic axial sectional view of the system of FIG. 10 after re-filling the bottle to be recharged;

FIG. 12A is a schematic axial sectional view of a liquid re-filling system according to a fourth variant of embodiment during a first phase of removal of the liquid conduit from the liquid transfer device which was engaged inside the bottle to be recharged;

FIG. 12B is a schematic axial sectional view of the system of FIG. 12A during a second phase of removal of the liquid conduit.

DESCRIPTION OF THE EMBODIMENTS

The invention which is described below with reference to the appended drawings relates in particular to a system for recharging with liquid a bottle or a container to be recharged from a bottle or a source container and an associated method. Generally, the bottle to be re-filled or recharged has already been used to dispense liquid such as fragrance or another liquid that has been consumed and the bottle must therefore be filled again as long as it is empty or nearly empty. The liquid which is to be transferred from the source bottle to the bottle to be recharged is viscous, that is to say it is for example an oil, a gel, a serum . . . . On the other hand, the water and the alcohol in particular are not part of the liquids that can be transferred within the framework of the present invention. The viscous liquids that the system according to the invention plans to transfer from a source bottle to a bottle to be recharged are liquids which typically have a minimum viscosity of the order of 20 to 25 centipoises.

FIG. 1 represents a bottle or a container to be recharged 10 which includes, at its lower end, a bottom 12 and, at its opposite upper end, an aperture 14.

Conventionally, such a bottle is generally equipped, in known manner, with a pump 16 connected, at its upper end, to a liquid distribution device or diffuser 18 and, at its opposite lower end, to a dip tube 20 intended to be immersed in the liquid contained in the bottle. A ring 22 provided with an internal thread is mounted on a shoulder of the body of the pump 16 and is intended to be screwed onto a complementary external thread of the neck 24 of the bottle.

In the example represented in FIG. 1, the assembly formed of the pump 16, the diffuser 18 and the dip tube 20 is removed from the bottle 10 in order to leave installed in the aperture 14 a hollow part 26 which is centered axially (along the vertical axis Z) in the aperture. The part 26 is removably fixed by an end 26*a* mounted on the inner rim 24*a* of the neck 24 which delimits the aperture 14, in particular by forcefully engaging the end 26*a* on the annular rim 24*a*. The part 26 extends to an opposite end 26*b*, called terminal end, following a generally convergent shape. The part has at its first end 26*a* a first diameter defining a first aperture (this first diameter cooperates with the peripheral rim 24*a*) and extends continuously to its terminal end 26*b*, where it has a second reduced diameter compared to the first diameter and which defines a second aperture smaller than the first aperture. The part 26 has for example a general shape of revolution about the axis Z and takes for example the general shape of a sleeve. The part 26 is thus tightened about the axis Z at the level of its terminal end 26*b* and has a certain radial elasticity (the part 26 is made of a flexible plastic material) allowing this terminal end to be moved radially when it meets another part and in particular, as will be seen later, during the introduction of a liquid conduit inside the bottle to be recharged 10 and inside the part 26. According to one variant not represented, the part 26 can be mounted in the aperture 14 of the bottle to be recharged 10 after removal of the assembly comprising the pump 16.

Alternatively, the bottle to be recharged 10 may not include the assembly formed in particular by the pump 16 and, thus, only be provided with a cap 28 screwed onto the neck 24 of the bottle. As represented on the right part of FIG. 1, the cap 28 includes, in its radially inner part relative to the outer sleeve 28*a* which includes an internal thread 28*b*, a cylindrical wall or flange 28*c*. This wall 28*c* provides with the sleeve 28*a* an annular space in which the threaded neck 24 of the bottle and the sleeve 26 of the bottle to be recharged 10 are housed, when the cap 28 is screwed onto the latter and thus closes the aperture 14. It will be noted that the bottle to be recharged can be made of different rigid (e.g. glass) or flexible materials. It will be noted that the part 26 can take shapes different from those described above.

FIG. 2 represents a rigid or flexible bottle or source container 30 which contains a viscous liquid in the sense defined above and at least part of which will be transferred to the bottle to be recharged 10 of FIG. 1.

The source bottle 30 comprises a bottom 32 and an aperture 34 opposite to the bottom which is disposed, in FIG. 2, above the bottom but which will be disposed below when the bottle 30 will be inverted as in FIG. 3. The bottle 30 is here equipped with a liquid transfer device 40 which is fixed on the bottle, for example by screwing (although other fixing modes can be envisaged) on the threaded neck 36 of the bottle, and which comprises two parts rotatably mounted relative to each other and each forming a ring.

The liquid transfer device 40 thus comprises a first ring 42 which is directly fixed, for example by screwing onto the neck 36. The first ring 42 comprises a double concentric ring structure including a first inner structure which comprises a central body 44 disposed in line with the aperture 34. The central body 44 comprises, on the one hand, a first portion 46 which extends substantially transversely relative to the vertical axis Z passing through the axial aperture 34 of the bottle and over the entire width or diameter of this aperture and, on the other hand, a second portion 48 which extends substantially axially from the outer periphery of the first portion 46, downwards in FIG. 2, and bears through an inner rim located at its distal end 48*a* on a peripheral seal J1 disposed between the inner rim and the upper edge 36*a* of the threaded neck 36. The central body 44 is disposed outside the bottle 30 and sealingly closes the aperture 34 of the latter. A sleeve 50 offset radially externally relative to the distal end 48*a* of the second portion 48 extends axially downwards facing the threaded neck 36. The sleeve 50 is provided, on its inner surface which is facing the threaded neck 36, with an internal thread 50*a* allowing it to be screwed onto the neck.

The double concentric ring structure of the first ring 42 also comprises a second outer structure which forms an outer ring 52 concentrically surrounding the first inner structure (44, 46, 48) described above. During the handling of the system by the user, the latter can use this second outer ring structure 52 as bearing for his fingers to indirectly grasp the bottle 30.

It will be noted that the first transverse extension portion 46 of the central body 44 has for example the appearance of a plate or a disk which is pierced in its thickness with two through holes O1 and O2 disposed in a diametrically opposite manner relative to the central axis of the aperture 34. The first aperture O1 opens out, on the inner side of the first ring 42, into a space communicating directly with the interior of the source bottle (disposed under the aperture O1 in FIG. 2). With regard to the second aperture O2, the central body 44 has, in its inner part oriented toward the interior of the bottle 30, and offset radially relative to the central axis of the aperture 34, a portion thickened relative to the thickness of the first portion 46 in which the first aperture O1 is made. This thickened portion is pierced along its entire thickness so as to define an axial chimney 44*a* opening out at one end (upper end in FIG. 2) onto the second aperture O2. A conduit C1 is force-fitted into this chimney 44*a*, through the opposite end (lower end in FIG. 2) of the latter, and extends axially downwards toward the bottom 32 of the bottle. The conduit C1 thus opens out at its lower end (FIG. 2) which is opposite to the upper end opening out onto the second aperture O2, in the vicinity of the bottom 32.

The liquid transfer device 40 also comprises a second ring 60 which is mounted axially on the first ring 42, that is to say in the axial extension of the latter, and is fixed to this first ring by interlocking of an axial engagement part 62 inside the first ring 42. More particularly, in FIG. 2, the axial engagement part 62 takes the form of a substantially cylindrical wall provided on its outer surface with snapping member(s) (e.g.: radial fingers) which cooperate(s) with one or several complementary retaining members (e.g.: radial peripheral flange) disposed on the inner face of the outer structure forming an outer ring 52, when the second ring 60 is engaged axially inside the first ring 42.

The second ring 60 also includes, on the side opposite to the side where the axial engagement part 62 is disposed, a body 64 which extends axially in a direction opposite to the direction of extension of the axial engagement part 62. This body 64 has a radial extension (or bulk) lower than that of the axial engagement part 62 insofar as the body 64 is intended to cooperate with the neck 24 of the bottle to be recharged 10 (the neck 24 generally has a diameter smaller than the diameter of the neck 36 of the source bottle which has a larger capacity), in particular by a portion which is fixed, for example by screwing onto the neck 24, and by a radially inner portion which is engaged inside the neck 24. The body 64 thus comprises a central part 66, disposed substantially in line with the first ring 42 and which extends along an axial height away from the first ring 42. The central part 66 comprises, in a centered manner axially about the axis Z, a central liquid conduit C2 which extends away from the body 64 (here toward the top of FIG. 2) to an opening end C2.1. The conduit C2 also includes a locally recessed annular portion C2.2 on its external surface (reduced external surface section or reduced external diameter). This recessed portion is positioned at a distance from the opening end C2.1 and from its opposite end. The central part 66 can also comprise, in a position radially external to the conduit C2, a cylindrical wall or flange 66*a* and, in a position radially external to the flange 66*a*, an axial sleeve 66*b* including an internal thread 66*b*1. The assembly formed by the conduit C2 and the flange 66*a* is intended to engage inside the aperture 14 of the bottle to be recharged 10, while the axial sleeve 66*b* is intended to cooperate externally with the threaded neck 24 and to surround the neck. The second ring 60 here includes a shoulder 68 which extends substantially transversely from the outer periphery of the body 64 and the axial engagement part 62 secured to this shoulder extends axially perpendicularly to the latter. An annular rim or flange 70, also secured to the shoulder 68, extends axially perpendicularly to the latter, in a radially inner position relative to the axial engagement part 62 and has an inner diameter adapted to engage around the first transverse extension portion 46 of the central body 44. More particularly, a stationary seal J2 is positioned between the first portion 46 of the first ring 42 (in particular the face of the first portion 46 from which the chimney 44*a* extends) and the body 64 of the second ring 60 (in particular the face of the body 64 which is opposite to the face from which the sleeve 66*b* and the flange 66*a* extend). This seal J2 is pierced in its thickness with two apertures O1' and O2' which are in geometric correspondence with the apertures O1 and O2. This seal J2 thus forms a fluid communication interface between the two rings assembled with each other. The flange 70 arranged around the inner structure 44 of the first ring thus ensures a positioning and a radial wedging of the seal J2.

Moreover, the body 64 is not full, as the axial section of FIG. 2 might suggest. Indeed, this body 64 is internally structured so as to provide, on the one hand, a liquid passage portion and, on the other hand, an air passage portion, as will be seen later within the framework of the operation of the liquid recharge system.

FIG. 2 also illustrates the fact that the visible part of the second ring 60, which is here an upper part, can be protected by a hood or cover 72 (optional) which covers it while waiting to be used for transferring liquid from this source bottle. As represented in FIG. 2, this hood 72 can for example have internal conformations allowing, on the one hand, the hood to be wedged in position by its bottom on the conduit C2 and, on the other hand, to be hung radially on the outer sleeve 66*b* of the second ring.

FIG. 3 illustrates a following step in the installation of the system on the bottle to be recharged 10 of FIG. 1 and the source bottle 30 (from which the possible hood 72 of FIG. 2 has been removed) is inverted such that its bottom 32 is positioned above its aperture 34. The source bottle 30 is positioned such that the aperture 34 is positioned above the bottle to be recharged 10. In the position of FIG. 3, the upper end of the conduit C1 which is located in the vicinity of the bottom 32 is disposed in an area of the bottle containing air and not liquid, the liquid initially present in this area going down toward the liquid transfer device 40 when the bottle has been inverted. It will be noted that during this operation, the user can grasp the source bottle 30 in particular via the outer ring structure 52 of the first ring 42.

More particularly, the liquid transfer device 40 which is mounted on the source bottle 30 is positioned above the bottle to be recharged 10 (this device 40 is also inverted and the orientations up and down, upper and lower . . . mentioned above during the description of FIG. 2 are to be reversed in FIG. 3). The second ring 60 is disposed above the aperture 14 of the bottle to be recharged 10 and is lowered vertically such that the liquid conduit C2 penetrates axially (gradually) through the aperture 14 of the bottle to be recharged and inside the latter by passing through the hollow part or sleeve 26 (funnel-shaped part).

By continuing the downward movement (FIG. 4) inside the hollow part 26 which is tightened at its terminal end 26*b*, the central part 66 of the body 64 comes into axial abutment against the neck 24 of the bottle to be recharged 10. More particularly, this abutment is the result of the complete screwing of the outer sleeve 66*b* onto the threaded neck 24. It will be noted that the introduction of the flange 66*a* inside the aperture 14 of the bottle and of the part 26 thus makes it possible to pinch this part between the flange and the sleeve in the position illustrated in FIG. 4. In this position, the terminal end 26*b* is located in an axial position corresponding to the axial position of the locally recessed annular portion C2.2 of the conduit C2. As represented in FIG. 4, the terminal end 26*b* is spaced apart from the external surface of reduced diameter of the conduit C2 by a small radial distance which here extends all around the conduit (in the manner of an annular space E1 which is arranged between the terminal end 26*b* of the part 26 and the locally recessed annular portion C2.2). In other words, the terminal end 26*b* is not in contact with the bottom of the locally recessed annular portion C2.2, where the diameter of the external surface of the conduit is radially opposite the terminal end 26*b*. This gap thus defines a reduced fluid passage section whose dimensions are adjusted according to the viscosity of the liquid that will be transferred into the bottle to be recharged. It will be noted that other embodiments can be envisaged to provide one or several radial spaces, here referenced E1, of reduced passage section(s) between the end 26 and the external surface of the conduit C2. The two elements 26*b* and C2.2 jointly form, locally, a device for restricting a passage section on the path of the air passage between the two bottles.

Thus, the more viscous the liquid, the greater the radial gap between the terminal end 26*b* and the restriction C2.2. It should be noted that it is not the total passage section between the part 26 and the conduit C2 that counts (for example the entire annular passage section) but the gap or the radial distance between the end 26*b* and the facing external surface C2.2 (along a radial direction) of the conduit C2 and which defines the radial passage restriction or reduced passage section. This gap or distance can be of the order of $1/10^{th}$ or a few $1/10^{th}$ mm. Thus, for a food oil, the radial distance between the two elements is for example 0.1 mm, even smaller than this value, and for a shampoo, the radial distance between the two elements is for example of the order of 0.5 to 0.8 mm. Generally, the restriction of the air passage section is adapted to the viscosity of the liquid.

Likewise, the inner passage section of the conduit C2 is greater as the liquid is viscous. For example, for a food oil, the inner section can be of the order of 20 $mm^2$ (i.e. an inner flow diameter of 5 mm for example), while for a shampoo that is more viscous, the section can be around 150 $mm^2$ (i.e. an inner flow diameter of $14/15$ mm for example).

In the position of FIG. 4, the liquid transfer device 40 is fixed to the bottle to be recharged (by screwing) via its second ring 60. Other fixing means can be alternatively envisaged, or no means, as will be seen later. In this position, no flow of the liquid contained in the inverted bottle 30 can take place because the liquid transfer device 40 is in a closed or blocked position.

The user then rotates one of the two bottles 10 and 30 relative to the other in order to rotate that of the two rings 42 and 60 which is fixed to the bottle that must rotate relative to the other ring. In this example, it is the bottle to be recharged 10 that rotates about the vertical axis Z (under the action of the user's fingers), thus driving in rotation the second ring 60 relative to the first ring 42 which remains fixed as well as to the seal J2 which also remains static. Particularly, during this movement, the axial engagement part 62 which is blocked axially relative to the outer ring structure 52 rotates inside the latter, just as the entire second ring 60 to which the part 62 and in particular the body 64 are secured.

Thus, after rotation, the liquid transfer device 40 is in the position of FIG. 5 where it is seen that the body 64 of the second ring 60 includes a liquid passage portion 65 which has the shape of a bent channel. This channel is now positioned so as to put into fluid communication the conduit C2 centered on the central axis of the aperture 14 of the bottle 10 with an aperture 65*a* offset laterally or radially relative to the conduit C2 and which is in fluid communication with the aperture O1' of the seal J2 and the aperture O1 in correspondence of the first ring 42. The channel 65 and the conduit C2 form jointly with the aperture O1' of the seal J2, the aperture O1 defined in the first portion 46 of the first ring, a liquid passage which extends between the source bottle 30 and the bottle to be recharged 10.

Likewise, after rotation (FIG. 5), it is seen that the body 64 of the second ring 60 includes an air passage portion 67, for example in the form of a channel, which is positioned so as to put into fluid communication the interior of the bottle to be recharged 10 (in its part or space E2 which is jointly delimited by the part 26 and the conduit C2) with an aperture 67*a* offset laterally or radially and which is in fluid communication with the aperture O2' of the seal J2 and the aperture O2 in correspondence of the first ring 42, and therefore with the air conduit C1. The aperture 67*a* is offset laterally relative to the conduit C2 and the channel 67 arranged laterally relative to the channel 65. The annular space E2 between the part 26 and the conduit C2, the air passage portion 67, the aperture O2' of the seal J2, the aperture O2 of the first ring 42 and the conduit C1 jointly form an air passage, distinct from the liquid passage, which extends from the bottle to be recharged 10 to the source bottle 30.

In accordance with the above, the first ring 42 thus comprises, on the one hand, a first portion of the liquid passage formed by the aperture O1 defined in the first portion 46 of the first ring 42 and, on the other hand, a first portion of the air passage (conduit C1, aperture O2' of the seal J2, and aperture O2 of the first ring 42) and, the second ring 60 comprises, on the one hand, a second portion C2 of the liquid passage (channel 65 and conduit C2) and, on the other hand, a second portion 67 of the air passage. It will be noted that the annular space E2 delimited between the part 26 and the conduit C2, including the air passage section restriction device described above (26*b* and C2.2) defines a portion of the air passage which is in permanent fluid communication with the second portion 67 of the air passage.

It will however be noted that the two rings can have other configurations in which the liquid passage portion (resp. the air passage portion) of each ring can take a different shape. For example, the liquid passage portion of the first ring can be enlarged (instead of being reduced at the aperture O1 in the portion 46) and become more like a channel.

In the blocking or closing position of FIG. 4, the two portions of the liquid passage and the two portions of the air passage of the two respective rings 42, 60 are not in fluid communication with each other.

In the transfer or opening position of FIG. 5, the two portions of the liquid passage and the two portions of the air passage of the two respective rings 42, 60 are in fluid communication with each other so as to allow the transfer of liquid from the source bottle 30 to the bottle to be recharged 10 through the two portions of the liquid passage (O1, O1', 65 and C2) which are in fluid communication with each other, and to transfer or expel the air contained in the bottle to be recharged 10 which rises into the source bottle 30 (in the area where the upper end of the conduit C1 opens out, in the vicinity of the bottom 32) through the air passage section restriction device described above (26*b* and C2.2), the downstream annular space E2 between the part 26 and the conduit C2 and through the two portions of the air passage (67, O2', O2 and C1) in fluid communication with each other.

More particularly, when the transfer device 40 of the liquid recharge system is in the transfer position of FIG. 5, the liquid contained in the top source bottle flows, here for example by simple gravity, through the liquid passage defined above (O1, O1', 65 and C2) and exits through the opening end C2.1, in particular in the form of drops or a net (due to the viscosity of the product) to start filling the bottle.

FIG. 6 illustrates the filling state of the bottle 10 when the transferred liquid L reaches the level (axial position along Z) where the terminal end 26*b* of the part 26 forms with the radially reduced local section C2.2 (groove) a passage section restriction device which thus defines a restricted passage area (reduced passage section) for the rising air flow. Under these conditions, due to the small dimensions of this restricted passage area (for example of the order of $1/10^{e}$ mm of gap between the terminal end 26*b* and the facing groove C2.2), the passage section dedicated to the liquid is too low for the liquid to be able to freely pass through this area given its viscosity and continue to rise in the bottle. As a result, the air contained between the bottle 10 and the part 26 can no longer escape through this area. Thus, the rise of the liquid in the bottle 10 is automatically stopped (and therefore the flow of the liquid from the source bottle), or at least slowed down at this area (control of the filling), without the user needing to intervene (to the extent that the stopping or slowdown device is solely due to the adequacy between the viscosity of the liquid and the reduced passage section). Generally, this position can be reached after several seconds or tens of seconds. Furthermore, at least one of the two bottles can be transparent, which allows the user to realize that the re-filling is complete, either when the level of the liquid no longer rises or almost no longer rises in the transparent bottle to be recharged, or when the liquid level no longer goes down in the transparent source bottle.

After reaching the position of FIG. 6, the user closes the liquid transfer device by proceeding in a manner reverse to the step described above from FIG. 4 and thus rotates the second ring 60 in the opposite direction in order to move from the position of FIG. 6 to the position of FIG. 4. When the liquid passage and air passage portions of the two respective rings are no longer in fluid communication with each other, the user can then decide to remove from the bottle to be recharged 10 the second ring 60 of the liquid transfer device 40 by lifting it vertically as indicated in FIG. 7.

During this step, the liquid conduit C2 slides axially against the terminal end 26*b* of the sleeve 26, by radially deforming this end outwards in an elastic manner, which thus scrapes the external surface of the conduit to its opening end C2.1. This action thus makes it possible to clean the external surface of the conduit C2 by ridding it of drops of liquid which are likely to have accumulated there, the scraped drops thus falling into the bottle. It will be noted that this action is made possible, on the one hand, by the fact that the part 26 is fixed to the bottle 10 and, on the other hand, by the fact that the diameter of the part 26 at the level of its terminal end 26*b* is smaller (in the undeformed elastic state), than the external diameter of the external surface of the conduit C2, outside the passage reduction area C2.2.

FIGS. 8A-8D illustrate, following cross-sectional views relative to the axis Z passing through the aperture of the bottle to be recharged, several possible embodiments of the air passage restriction area (reduced passage section of the air passage) arranged between the part 26 and the liquid conduit C2 and therefore of a device for restricting a passage section of the air passage which defines this area.

FIG. 8A represents the embodiment described above in relation to the previous figures and according to which an annular groove C2.2 is made in the external surface of the conduit C2 and thus forms, with the internal surface facing the opening end 26*b*, a peripheral radial space E1 (annulus or crown) which defines the reduced passage section of the air passage.

FIG. 8B illustrates another possible embodiment in which two depressions or recesses C2.21' and C2.22', here diametrically opposite, are made in the external surface of the conduit C2' and thus each form, with the internal surface facing the opening end 26*b*, a local radial space which locally defines a reduced passage section of the air passage.

FIG. 8C illustrates another possible embodiment in which three depressions or recesses C2.21", C2.22" and C2.23", here distributed along an angular gap of 120° relative to each other, are made in the external surface of the conduit C2" and thus each form, with the internal surface facing the opening end 26*b*, a local radial space which locally defines a reduced passage section of the air passage.

It will be noted that a different number of radial spaces can thus be arranged on the external surface of the liquid conduit, with a different arrangement and shape.

Alternatively, as illustrated in FIG. 8D, the external surface of the conduit C2 is not modified locally but the part 26.1 can adopt a configuration, for example locally thinned radially at its terminal end in order to define a reduced passage section for the air. Here, three depressions or recesses 26.11, 26.12 and 26.13, for example distributed at an angular gap of 120° relative each other, are made in the internal surface of the terminal end 26.1*b* of the part 26.1 and thus each form, with the external surface facing the conduit C2, a local radial space which locally defines a reduced passage section of the air passage. A different number of recesses with a different arrangement, even one or several other local conformations of the part surrounding the conduit C2, can also be envisaged.

FIG. 9 illustrates a variant of embodiment in which the part 26' (this part, for example in the form of a sleeve, coaxially surrounds the liquid conduit C2 and providing with the liquid conduit C2 one or several radial spaces defining the reduced passage section of the air passage) is no longer carried by the bottle to be recharged 10', but by the source bottle 30. This variant is used when it is not necessary to clean the external surface and in particular the opening end C2.1 of the conduit after transfer of liquid and filling of the bottle to be recharged. This can be useful when the liquid does not stick to the surfaces. The bottle to be recharged thus has one less part and forms a bottle of the conventional type.

In the example of FIG. 9, the part is mounted around the flange 66*a*, between the latter and the axial sleeve 66*b*. In this way, during the mounting of the liquid transfer device on the neck 24 of the bottle to be recharged 10', and in particular during the screwing of the second ring 60' onto this neck, the part 26' is still inserted between the internal surface of the flange 24 and the flange 66*a*.

However, during the removal of the liquid transfer device, as represented in FIG. 9, the part 26' is also removed since it is linked to the second ring 60'. The other elements described with reference to the previous figures also form part of this variant and are not repeated.

FIG. 10 illustrates another variant of embodiment which differs from the previous embodiment and variants of embodiment in that the second ring 60" of the liquid transfer device is no longer mounted on the neck 24 of the bottle to be recharged but is simply inserted inside the neck by the flange 66*a* which still bears against the part 26. The sleeve 66*b* of the previous figures is removed and an outer sleeve 66*b*" extends coaxially to the flange and the neck 24, substantially in alignment with the outer ring structure 52 of the first ring 42. To do so, the second ring 60" is slightly modified by radial widening of the body 64" thereof, so that the sleeve 66*b*" extends axially from the outer periphery thereof. As represented in the figure, the user's fingers are applied to the outer sleeve 66*b*" to rotatably manipulate the second ring 60" relative to the first ring 42 and thus open or close the liquid transfer device, as needed. The other hand of the user can grasp the first ring screwed onto the bottle 30 during this rotational movement of the second ring in order to immobilize the bottle in rotation. The other elements described with reference to the previous figures are also part of this variant and are not repeated.

This variant is advantageous as long as it is not screwed onto the neck of the bottle to be recharged and therefore does not require having a second ring with a thread adapted to that of the neck of the bottle to be recharged. The transfer device according to this variant is thus more universal since it can interface with a wide variety of bottles to be recharged (with or without thread) without the need for a specific mounting system.

FIGS. 11A-B illustrate another variant of embodiment which differs from the previous embodiment and variants of embodiment in that the recharging system comprises a liquid passage and a distinct air passage which are both permanently in fluid communication with the bottle to be recharged as soon as the liquid transfer device D is partially introduced into the aperture of the neck of the bottle to be recharged (FIG. 11A) and is positioned to bear against the latter (FIG. 11B). The liquid transfer device D still occupies a single position allowing the transfer of liquid from the source bottle 30 to the bottle to be recharged and simultaneously a reverse air passage from the bottle to be recharged to the source bottle. The bottle to be recharged 10 is identical to that of FIGS. 1 to 7. This variant is simpler to make and easier to implement than the previous embodiment and variants of embodiment.

In this variant, the liquid transfer device D takes for example the form of a ring B1, a first part of which forming a sleeve B1.1 is mounted by screwing on the neck 36 of the source bottle, as with the sleeve 50 of FIG. 2, and a second part B1.2 of which extends axially the first part and extends transversely/radially to partially close the aperture of the source bottle 30. The second part B1.2 integrates in its transverse extension portion, on one side which is oriented toward the interior of the source bottle 30, the air conduit C1, for example fitted into a chimney B1.21, and on the opposite side which is oriented toward the outside of the source bottle, a liquid conduit C2' similar to the conduit C2. The second part B1.2 thus integrates in the thickness of its transverse extension portion, an air passage portion P1 communicating with the conduit C1 and which opens out into an annular space delimited by an outer flange which extends axially away from the second part B1.2 and coaxially surrounds the conduit C2'. The same arrangement was provided in the embodiment of FIG. 5 with the flange 66*a* at the outlet of the air passage portion 67. The conduit C2' has the same characteristics as the conduit C2 with its localized outer section reduction C2.2' and its opening end C2.1'.

As represented in FIG. 11B, the conduit C2' is inserted into the aperture 14 of the neck 24 so as to bear against the upper edge of the latter, with the flange B1.22 bearing radially against the part 26 and the reduced air passage section thus formed between the end 26*b* of the part 26 and the outer section restriction C2.2' of the conduit. Thus, the same arrangement as the one described above is made in this variant with the same advantages.

As in the embodiment and the variants described above, the stopping or the slowdown of the rise of the liquid in the bottle to be recharged (and therefore the stopping or the slowdown of the liquid transfer) is obtained in an identical manner with the same advantages.

FIGS. 12A-B illustrate another variant of embodiment which uses the embodiment of FIGS. 1 to 7 but which differs in two aspects:

on the one hand, the liquid conduit C2" includes a free opening end C2.1" which is shaped in the form of an outer rim or shoulder, and, on the other hand, the part 26 mounted on the internal rim 24*a* of the neck 24 of the bottle to be recharged 10 can be dismounted/removed axially from the latter during the removal of the second ring 60" of the liquid transfer device 40" (FIGS. 12A and 12B) following the engagement of the shaped free opening end C2.1" against the opening end 26*b* of the part 26, which has the effect of driving upwards the part 26 by disengaging it from the internal rim 24*a* of the neck 24.

As represented in FIG. 12B, the part 26 is thus carried away by the second ring 60", and therefore removed from the bottle to be recharged, while being held to bear on the end of the conduit C2" thereof. Thus, the bottle to be recharged which has just been re-filled can be quickly reused by replacing in it either the assembly provided with the pump 16 of FIG. 1 or the cap 28 of this figure. The part 26 can for example be removed manually from the second ring 60".

During the removal of the conduit C2" from the bottle to be recharged (FIG. 12A), it will be noted that the opening end 26*b* still provides a cleaning function by scraping the drops of liquid remaining on the external surface of the conduit and this, to the end C2.1".

Other means of mechanical cooperation between the second ring 60 and the part 26 can alternatively be envisaged to allow removing the part 26 with the second ring 60.

Everything that has been described previously within the framework of the description of the embodiment of FIGS. 1 to 7 applies to the different variants described after this embodiment, except in the case of a technical incompatibility between the embodiments.

The invention claimed is:

1. A system for recharging with liquid a bottle to be recharged from a source bottle containing a viscous liquid, the bottle to be recharged having an aperture disposed above the bottom and the source bottle having an aperture and a bottom opposite to the aperture, the source bottle containing viscous liquid being inverted such that its aperture is disposed above the aperture of the bottle to be recharged, the system comprising:

a liquid passage which extends between the source bottle and the bottle to be recharged by opening out through an opening end inside the bottle to be recharged and which is able to put into communication the source bottle and the interior of the bottle to be recharged so as to allow the transfer of liquid from the source bottle to the bottle to be recharged through the liquid passage, the liquid passage comprising a liquid conduit provided with the opening end of the liquid passage and which extends axially at least partly inside the bottle to be recharged, an air passage distinct from the liquid passage and which extends from the interior to the exterior of the bottle to be recharged through the aperture of the bottle to be recharged so as to allow the discharge of air from the bottle to be recharged while liquid is transferred from the source bottle to the bottle to be recharged, a part surrounding the liquid conduit coaxially and providing with the liquid conduit one or several radial spaces defining a reduced passage section of the air passage which is adapted to the viscosity of the liquid, the reduced passage section of the air passage being disposed inside the bottle to be recharged above the opening end of the liquid conduit so as to stop, or at least slow down, the rise of liquid in the bottle to be recharged, and therefore the flow of liquid in said bottle to be recharged, when the liquid level in the bottle to be recharged reaches the reduced passage section of the air passage.

2. The system for recharging with liquid a bottle to be recharged according to claim 1, characterized in that the part surrounding an external surface of the liquid conduit includes a terminal end which is configured to engage radially in a radially recessed annular portion of the external surface of the liquid conduit.

3. The system for recharging with liquid a bottle to be recharged according to claim 1, characterized in that the part surrounding the liquid conduit is mounted on the bottle to be recharged.

4. The system for recharging with liquid a bottle to be recharged according to claim 1, characterized in that the air passage extends from the bottle to be recharged to the source bottle and is able to put into communication the interior of the bottle to be recharged and the bottom of the source bottle so as to allow the rise of air from the bottle to be recharged towards the bottom of the source bottle, while liquid is transferred from the source bottle to the bottle to be recharged.

5. The system for recharging with liquid a bottle to be recharged according to claim 1, characterized in that it includes a liquid transfer device mounted on the source bottle and which comprises the liquid conduit.

6. The system for recharging with liquid a bottle to be recharged according to claim 5, characterized in that the part surrounding the liquid conduit is mounted on the liquid transfer device.

7. The system for recharging with liquid a bottle to be recharged according to claim 5, characterized in that the liquid transfer device also comprises an air conduit which forms part of the air passage and which extends inside the source bottle toward the bottom of the latter.

8. The system for recharging with liquid a bottle to be recharged according to claim 5, characterized in that the liquid transfer device comprises two rings rotatably mounted relative to each other, namely a ring comprising, on the one hand, the liquid conduit which forms a first portion of the liquid passage and, on the other hand, a first portion of the air passage and another ring comprising, on the one hand, a second portion of the liquid passage and, on the other hand, a second portion of the air passage.

9. The system for recharging with liquid a bottle to be recharged according to claim 8, characterized in that the two rings are able to occupy, on the one hand, a blocking position in which the two portions of the liquid passage and the two portions of the air passage of the two respective rings are not in fluid communication with each other and, on the other hand, a transfer position in which the two portions of the liquid passage and the two portions of the air passage of the two respective rings are in fluid communication with each other so as to allow the transfer of liquid from the source bottle to the bottle to be recharged through the two portions of the liquid passage which are in fluid communication with each other, and to transfer the air contained in the bottle to be recharged to the source bottle through the reduced passage section of the air passage and the two portions of the air passage in fluid communication with each other.

10. The system for recharging with liquid a bottle to be recharged according to claim 8, characterized in that it includes a seal forming a fluid communication interface between the two rings.

11. A method for recharging with liquid a bottle to be recharged from a source bottle containing a viscous liquid in a system comprising, on the one hand, a bottle to be recharged having an aperture disposed above the bottom and, on the other hand, a source bottle containing viscous liquid and having an aperture and a bottom opposite to the aperture, the source bottle being inverted such that its aperture is disposed above the aperture of the bottle to be recharged, the method comprising the following steps:

flowing of liquid from the source bottle to the bottle to be recharged via a liquid passage which opens out through an opening end inside the bottle to be recharged in which the liquid rises, discharge of the air contained in the bottle to be recharged through an air passage distinct from the liquid passage and which extends from the interior to the exterior of the bottle to be recharged through the aperture of the bottle to be recharged, while the liquid level rises in the bottle to be recharged, stopping or slowdown of the rise of liquid in the bottle to be recharged, and therefore of the flowing of liquid in the bottle to be recharged via the liquid passage, when the liquid level in the bottle to be recharged reaches a reduced passage section of the air passage which is disposed inside the bottle to be recharged above the opening end of the liquid passage, the stopping or slowdown of the rise of liquid in the bottle to be recharged being due to the adaptation between the reduced passage section of the air passage and the viscosity of the liquid.

12. The method for recharging with liquid a bottle to be recharged according to claim 11, characterized in that the liquid passage comprises a liquid conduit which is provided with the opening end of the liquid passage and which extends axially at least partly inside the bottle to be recharged.

13. The method for recharging with liquid a bottle to be recharged according to claim 12, characterized in that, prior to the steps of flowing of liquid, discharge of air and stopping or slowdown of the rise of liquid, the method comprises a prior step during which the opening end of the liquid conduit which is fixed to the source bottle is introduced inside the bottle to be recharged.

14. The method for recharging with liquid a bottle to be recharged according to claim 12, characterized in that the system comprises two rings rotatably mounted relative to each other, namely a ring comprising, on the one hand, the liquid conduit which forms a first portion of the liquid passage and, on the other hand, a first portion of the air passage and, another ring comprising, on the one hand, a second portion of the liquid passage and, on the other hand, a second portion of the air passage.

15. The method for recharging with liquid a bottle to be recharged according to claim 14, characterized in that a ring (42) is fixed to the source bottle and the other ring is fixed to the bottle to be recharged with the opening end of the liquid conduit which is introduced inside the bottle to be recharged.

16. The method for recharging with liquid a bottle to be recharged according to claim 15, characterized in that, when the other ring is screwed onto the bottle to be recharged, the method includes a step during which a relative rotational movement between the two bottles, and therefore between the two rings, is carried out in order to put into fluid communication the two portions of the liquid passage and the two portions of the air passage of the two respective rings with each other and thus to allow the flow of liquid from the source bottle to the bottle to be recharged through the two portions of the liquid passage in fluid communication and the rise of the air contained in the bottle to be recharged through the reduced passage section of the air passage and the two portions of the air passage in fluid communication.

17. The method for recharging with liquid a bottle to be recharged according to claim 11, characterized in that the air contained in the bottle to be recharged is transferred from the bottle to be recharged to the source bottle via the air passage.

18. The method for recharging with liquid a bottle to be recharged according to claim 11, characterized in that the system includes a part surrounding the liquid conduit coaxially and providing with the liquid conduit one or several radial spaces defining the reduced passage section of the air passage.

19. The method for recharging with liquid a bottle to be recharged according to claim 18, characterized in that, during the removal of the liquid conduit from the bottle to be recharged, the part surrounding the liquid conduit scrapes the external surface of the liquid conduit to its opening end.

* * * * *